(12) United States Patent
Schutyser et al.

(10) Patent No.: US 8,428,860 B2
(45) Date of Patent: Apr. 23, 2013

(54) VEHICLE DRIVING ASSISTANCE

(75) Inventors: Pieter Jan Schutyser, Eindhoven (NL); Jeroen Ploeg, Helmond (NL); Hans-Martin Duringhof, Houten (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 724 days.

(21) Appl. No.: 12/526,478

(22) PCT Filed: Feb. 22, 2008

(86) PCT No.: PCT/NL2008/050108
§ 371 (c)(1),
(2), (4) Date: Aug. 7, 2009

(87) PCT Pub. No.: WO2008/103048
PCT Pub. Date: Aug. 28, 2008

(65) Prior Publication Data
US 2010/0312434 A1      Dec. 9, 2010

(30) Foreign Application Priority Data
Feb. 22, 2007   (EP) ..................................... 07102854

(51) Int. Cl.
*G08G 1/16* (2006.01)
*G06F 13/376* (2006.01)

(52) U.S. Cl.
USPC ............... 701/301; 701/41; 701/70; 340/3.41

(58) Field of Classification Search ............ 701/23, 701/41, 301, 42, 70; 180/204, 6.2, 6.24; 340/903, 436, 3.4, 3.41
See application file for complete search history.

(56) References Cited

U.S. PATENT DOCUMENTS

| | | | |
|---|---|---|---|
| 5,870,303 A | 2/1999 | Trovato et al. | |
| 6,324,465 B1 * | 11/2001 | Teramura et al. | ............... 701/96 |
| 6,477,515 B1 | 11/2002 | Boroujerdi et al. | |
| 6,940,448 B2 * | 9/2005 | Knoop et al. | ................... 342/70 |

(Continued)

FOREIGN PATENT DOCUMENTS

| | | |
|---|---|---|
| EP | 0 483 905 A2 | 5/1992 |
| JP | 06-309595 | 11/1994 |
| JP | 2000-128007 A | 5/2000 |
| WO | WO 2005/054008 A1 | 6/2005 |

OTHER PUBLICATIONS

International Search Report dated May 21, 2008, for PCT/NL2008/050108.

*Primary Examiner* — Thomas Black
*Assistant Examiner* — Ce Li
(74) *Attorney, Agent, or Firm* — Leydig, Voit & Mayer, Ltd.

(57) ABSTRACT

A vehicle (2) comprises sensor units (10) for collecting sensor data, and a processing unit (11) for processing the sensor data. A method of providing driving assistance information comprises the steps of: determining the cost (c) of pairs (30, 31, 32) of acceleration values on the basis of the sensor data, each pair of acceleration values representing a longitudinal (a lon) and a lateral (a lat) acceleration of the vehicle, —selecting a pair (32) of least cost acceleration values, and—providing driving assistance information including the pair of least cost acceleration values. The processing unit (10) may be arranged for providing visible, audible and/or haptic driving assistance information to the driver of the vehicle, and/or for providing steering assistance.

19 Claims, 4 Drawing Sheets

U.S. PATENT DOCUMENTS

| | | |
|---|---|---|
| 7,016,783 B2 | 3/2006 | Hac et al. |
| 7,280,813 B2 * | 10/2007 | Elliott et al. .............. 455/243.1 |
| 7,433,772 B2 * | 10/2008 | Isaji et al. ...................... 701/71 |
| 7,493,200 B2 * | 2/2009 | Takahashi et al. .............. 701/41 |
| 7,629,899 B2 * | 12/2009 | Breed ........................... 340/903 |
| 2003/0220772 A1 * | 11/2003 | Chiang et al. ..................... 703/2 |
| 2004/0093160 A1 * | 5/2004 | Knoop et al. ................. 701/301 |
| 2004/0128096 A1 * | 7/2004 | Luo ................................ 702/96 |
| 2004/0193374 A1 * | 9/2004 | Hac et al. ..................... 701/301 |
| 2004/0199327 A1 * | 10/2004 | Isogai et al. ................. 701/301 |
| 2005/0236895 A1 * | 10/2005 | Matsumoto et al. .......... 303/140 |
| 2007/0008090 A1 * | 1/2007 | Gertsch et al. ................ 340/435 |
| 2007/0282530 A1 * | 12/2007 | Meister et al. ................ 701/301 |
| 2008/0167777 A1 * | 7/2008 | Pothin ............................ 701/41 |
| 2008/0319610 A1 * | 12/2008 | Oechsle et al. ................. 701/41 |

* cited by examiner

VEHICLE DRIVING ASSISTANCE

FIELD OF THE INVENTION

The present invention relates to vehicle driving assistance. More in particular, the present invention relates to a device for and a method of providing driving assistance information for a vehicle.

BACKGROUND

It is well known to provide vehicle driving assistance, in particular to avoid collisions but also to assist a driver in parking or other manoeuvres. ABS (Anti-lock Brake System) has been in use for several years and assists in driver-initiated braking of a vehicle. ABS avoids skidding but otherwise does not affect the course of the vehicle.

U.S. Pat. No. 7,016,783 discloses a method and a system for collision avoidance using automated braking and steering. In this known system, distance thresholds are used to take steering control decisions. Depending on the relative distance of an obstacle, the system may brake and steer around an obstacle. On the basis of the thresholds and the measured relative distances the known system decides which of a set of essentially predetermined actions is taken, for example changing lanes. The flexibility of this known system is therefore limited. In addition, the known system seeks to avoid collisions but fails to minimise the effects of an unavoidable collision. Furthermore, the known system ignores any discomfort that may be experienced by the driver during braking and/or steering.

SUMMARY OF THE INVENTION

It is an object of the present invention to overcome these and other problems of the Prior Art and to provide a generic method and system for vehicle driving assistance which is flexible and allows any course of the vehicle to be taken into account.

It is a further object of the present invention to provide a generic method and system for vehicle driving assistance which makes it possible to take any driver discomfort into account.

Accordingly, the present invention provides a device for providing driving assistance information for a vehicle, the device comprising:
  sensor units for collecting sensor data concerning the vehicle and its surroundings,
  a processing unit for:
    determining the cost of pairs of acceleration values on the basis of the sensor data, each pair of acceleration values representing a longitudinal and a lateral acceleration of the vehicle,
    selecting a pair of least cost acceleration values, and for
    providing driving assistance information including the pair of least cost acceleration values.

By determining the cost of pairs of acceleration values and selecting the least cost pair, an optimal combination of longitudinal and lateral accelerations may be selected in all circumstances. The sensor data may comprise data indicative of the distance and (relative or absolute) speed of objects such as other vehicles, and/or data indicative of the road width and/or obstacles. The sensor data may also comprise data indicative of the air temperature and/or road temperature. The term sensor data is further meant to encompass data which may be retrieved from storage, such as road information and technical information regarding the vehicle.

The present invention allows any sensor data to be taken into account and can be used for manually and/or automatically controlling a vehicle, more in particular for collision avoidance, manoeuvring, lane control and other vehicle control purposes.

The longitudinal acceleration can be positive (true acceleration), negative (deceleration) or zero (no speed change). Similarly, the lateral acceleration can be positive (e.g. to the left), negative (e.g. to the right) or zero, preferably measured relative to the present direction of travel. The accelerations are typically limited by physical constraints, such as the maximum possible (positive) longitudinal acceleration of the vehicle given the engine power, the road conditions and the number of passengers. Similarly, the lateral acceleration will be limited by the road condition and the characteristics of the vehicle and its tyres.

The cost assigned to a pair of acceleration values may include the cost of discomfort to the driver and passengers, the cost of a collision, and other costs. The present invention therefore provides a generic method and device for vehicle control.

In accordance with a further aspect of the present invention, physical constraints are also expressed as costs, assigning "infinite" costs to physically impossible accelerations.

It is preferred that the processing unit is arranged for determining the pair of least cost acceleration values by determining the cost of an initial set of pairs of acceleration values, determining the cost of surrounding pairs, and then selecting the pair having the least cost. This procedure of comparing the cost of a pair with the cost of surrounding pairs allows a least cost pair to be found.

In theory the number of different pairs of acceleration values can be infinite. To facilitate the optimization process, it is preferred to limit the number of pairs. This can be accomplished when the acceleration values have discrete values. That is, only a limited number of discrete acceleration values are taken into account, disregarding any intermediate values. Accordingly, a grid of acceleration values may be used, the coarseness of the grid being determined by practical considerations, such as the accuracy required and the computing power available.

The processing unit may use any pair of acceleration values as the initial pair. However, it is preferred that the initial set of pairs is predetermined. This allows the search for the least cost pair to start from an advantageous position.

As mentioned above, the present invention assigns costs to accelerations. This may be accomplished by determining distances to other objects at a future point in time, given a particular pair of accelerations. By assigning costs to accelerations instead of, for example, trajectories, a very direct coupling between the selected least cost pair and the desired braking, acceleration and/or steering of the vehicle is obtained. In addition, a relatively simple computational model is obtained, thus reducing the computational load and increasing the processing speed. Furthermore, driver comfort or discomfort can easily be derived from a pair of accelerations.

The cost of each pair of acceleration values can be determined in several ways. It is preferred that the processing unit is arranged for determining the cost of a pair by weighing sensor data. That is, sensor data representing information relating to the distance of objects, the (relative) speed of objects and/or the size of objects are suitably weighed to produce the cost of a pair of acceleration values. Accordingly, the processing unit may be arranged for determining the cost of a pair by involving the position and relative speed of another object, the comfort of the driver, the occurrence of a collision, and/or properties of the vehicle.

The selected least cost pair of acceleration values may be used in several ways. For example, the processing unit may be arranged for providing visible, audible and/or haptic driving assistance information to the driver of the vehicle. Such driving assistance information may comprise warning signals, braking directions and/or steering directions, for example "brake to avoid collision", "accelerate to avoid collision", "swerve left to avoid obstacle".

In addition to providing information which essentially is advice to the driver of the vehicle, the processing unit may be coupled to a steering unit in order to provide steering assistance. Additionally, or alternatively, the processing unit may be coupled to a braking unit in order to provide braking assistance and/or further control units to release or depress the accelerator, and/or to shift gears (downshifting).

An information provision unit may be provided to translate any driving assistance information produced by the processing unit into suitable signals.

The present invention further provides a vehicle control system comprising a device as defined above, and a vehicle comprising a device as defined above. The vehicle may be a car, bus or truck, an airplane or helicopter, a ship or any other suitable transport means.

The present invention also provides a method of providing driving assistance information for a vehicle comprising sensor units for collecting sensor data concerning the vehicle and its surroundings and a processing unit for processing the sensor data, the method comprising the steps of:

determining the cost of pairs of acceleration values on the basis of the sensor data, each pair of acceleration values representing a longitudinal and a lateral acceleration of the vehicle, selecting a pair of least cost acceleration values, and providing driving assistance information including the pair of least cost acceleration values.

The method of the present invention has the same advantages as the device of the present invention. It is preferred that the acceleration values have discrete values, and/or that the initial set of pairs is predetermined. Other advantageous embodiments of the method of the present invention will become apparent from the description below.

The present invention additionally provides a computer program product for causing a programmable computer to carry out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example as a signal via the Internet.

BRIEF DESCRIPTION OF THE DRAWINGS

The present invention will further be explained below with reference to exemplary embodiments illustrated in the accompanying drawings, in which.

DETAILED DESCRIPTION OF THE DRAWINGS

Figure 1:
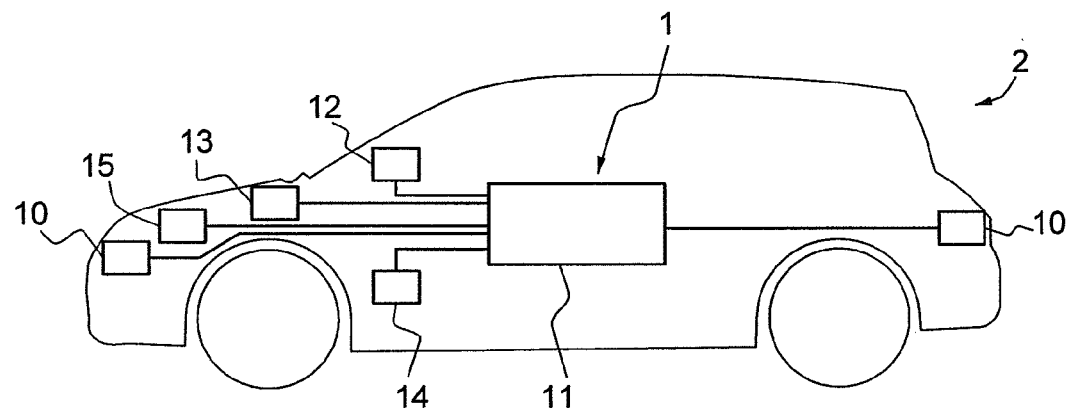
FIG. 1 schematically shows a vehicle provided with a system according to the present invention.

An embodiment of the system 1 according to the present invention is shown in FIG. 1 to be mounted in a vehicle 2. The system 1 illustrated merely by way of non-limiting example in FIG. 1 comprises sensor units 10, a main or processing unit 11, an information provision unit 12, a steering unit 13, a braking unit 14 and an engine control unit 15. The sensor units 10, the information provision unit 12, the steering unit 13, the braking unit 14 and the engine control unit 15 are coupled to the processor unit 11 by wires or by wireless (e.g. Bluetooth®) links.

The sensor units 10 may be mounted in several parts of the vehicle. It will be understood that more than two sensor units 10 may be present, and that various sensor types may be used, for example acoustic sensors, IR (Infra-Red) sensors, (visible) light sensors, and also cameras (e.g. webcams). Some sensor units may comprise acceleration sensors and/or thermometers. The sensor units may be passive units which merely receive energy (such as electro-magnetic or acoustic energy) or active units which both transmit and receive energy. Examples of active sensor units are radar units and active IR units.

The sensor units may, for example, provide data concerning distances to other objects, absolute or relative speeds (using distance or e.g. Doppler measurements), moisture, temperature, acceleration (using acceleration sensors), the position (angle) of the steering wheel, the position (angle) of the foot pedals, the rotational velocity of the wheels, the yaw rate of the vehicle, the engine torque and/or the temperature of the brakes.

The processing unit 11 may comprise a processor, memory (both volatile and non-volatile) and further circuitry. The processor is arranged for processing a suitable software program stored in the memory, the software program containing instructions for carrying out the method of the present invention. Data produced by the sensor units (and any additional data retrieved from storage) are processed by the processing units in a manner that will be described below.

In the embodiment shown, the system of the present invention comprises an information provision unit 12 which is preferably mounted in the vicinity of the driver, for example on or in the dashboard. The information provision unit 12 is arranged for providing visual and/or acoustic information to the driver. Visual information may include warning lights and/or displayed texts, while acoustic information may include warning sounds and/or speech generated by a voice synthesizer. By means of the information provision unit 12, the system 1 provides passive driving assistance.

The system 1 shown in FIG. 1 further comprises a steering unit 13, a braking unit 14 and an engine control unit 15 for active driving assistance, that is, driving assistance which complements and may even override the driver's control of the vehicle. The steering unit 13 is coupled to the steering mechanism of the vehicle, the braking unit 14 is coupled to the vehicle's braking system, while the engine control unit 15 is coupled to the accelerator pedal or the engine of the vehicle 2. The steering unit 13, the braking unit 14 and the engine control unit 15 may receive suitable control commands from the processing unit 11.

Additional units (not shown) for active driving assistance may be provided, for example units providing haptic information such as steering wheel vibrations and/or power steering adaptations.

Figure 2:
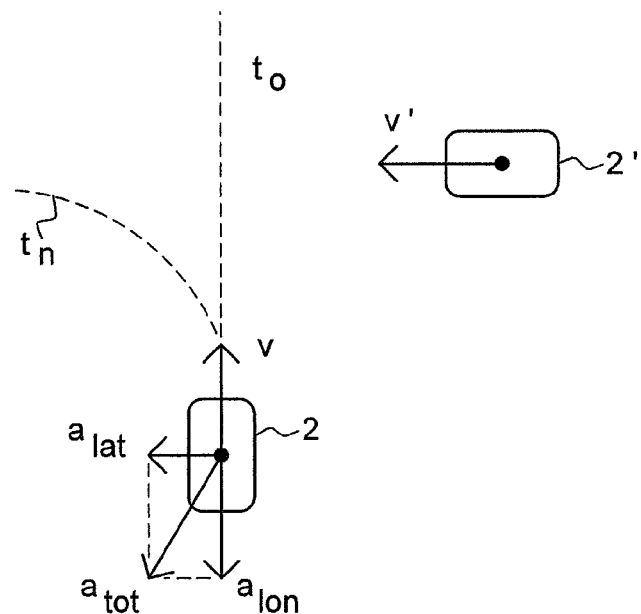
FIG. 2 schematically shows trajectories and accelerations of a vehicle as may be controlled in accordance with the present invention.

The principle of the present invention is schematically illustrated in FIG. 2. In the example of FIG. 2, a first vehicle 2 initially has zero acceleration and therefore a constant speed v which results in an original trajectory $t_o$. However, a second vehicle 2' approaches from the right. The distance between the vehicles 2 and 2' is found to be decreasing and is expected to reach zero (collision) if no action is taken. As a predicted collision implies a high cost, the acceleration of the vehicle should be changed. Therefore both a longitudinal acceleration $a_{lon}$ and a lateral acceleration $a_{lat}$ are imparted on the vehicle 2. The longitudinal acceleration $a_{lon}$ is in a direction opposite to the velocity v and therefore results in a deceleration of the first vehicle 2. The lateral acceleration $a_{lat}$ is, in the example of FIG. 2, directed to the left and therefore results in a turning away from the second vehicle 2', as shown by the new trajectory $t_n$.

This new trajectory $t_n$ avoids a collision and the accelerations causing this trajectory therefore have a substantially lower cost than the accelerations associated with the original trajectory $t_o$. However, the lateral acceleration $a_{lat}$ is not larger than necessary to avoid a collision (apart from an optional safety margin) in order to minimize the discomfort experienced by the driver and any passengers due to the manoeuvre. Accordingly, the present invention seeks to minimize the cost involved with any accelerations of the vehicle, while said cost may involve various factors, such as having a collision and causing discomfort to the driver by swerving or braking. By using a cost criterion, various factors influencing the movements of the vehicle can be taken into account.

Figure 3:
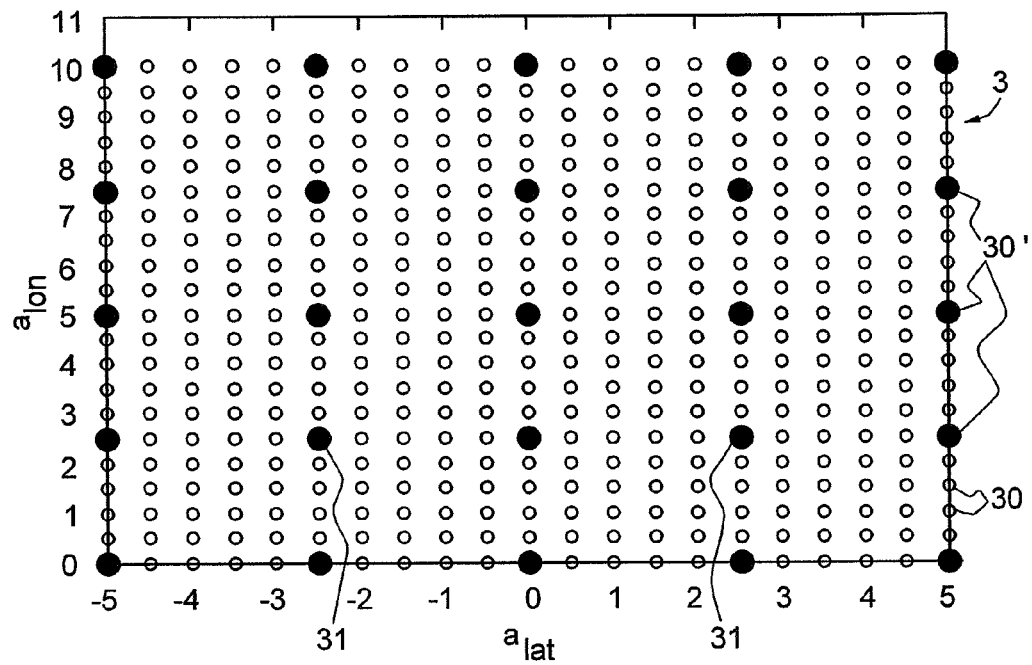
FIG. 3 schematically shows an initial grid of acceleration values as used in the present invention.
Figure 4:
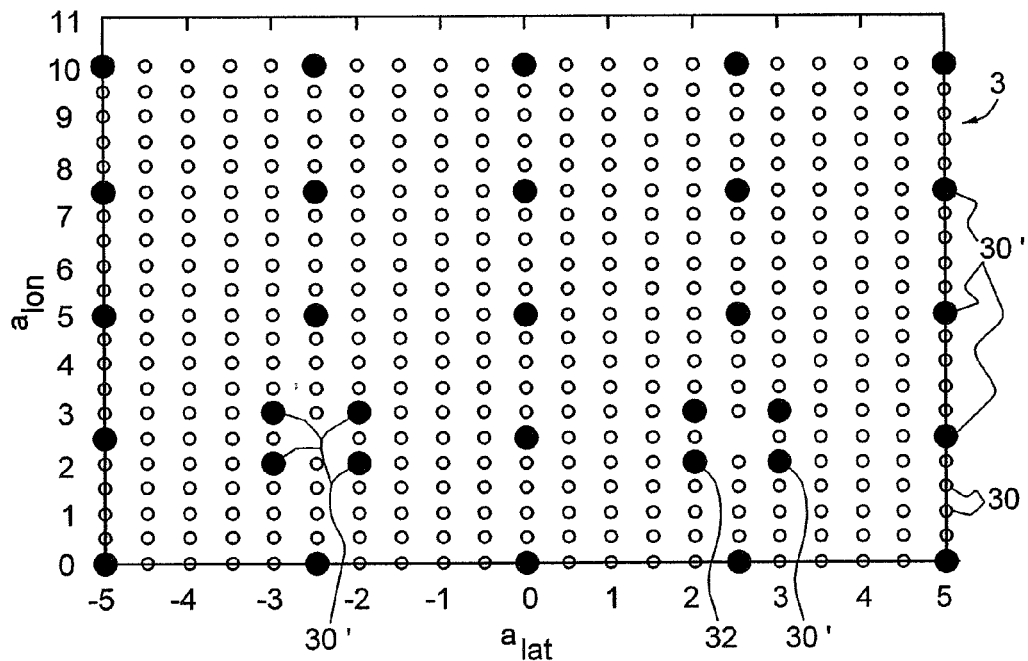
FIG. 4 schematically shows the grid of FIG. 3 after a first iteration in a least cost selection process.

The selection of a pair of accelerations in accordance with the present invention is schematically illustrated in FIGS. 3 & 4. The movements of the vehicle (2 in FIGS. 1 & 2) are represented by its longitudinal acceleration $a_{lon}$ and its lateral acceleration $a_{lat}$, which are measured along the vertical axis and the horizontal axis respectively. The lateral acceleration $a_{lat}$ can have both negative ("left") and positive ("right") values. In the example of FIGS. 3 & 4 only decelerations are used in the longitudinal direction. Although decelerations may be referred to as "negative" accelerations, the decelerations are represented by positive numbers in FIGS. 3 & 4 as no confusion is possible in the present example.

In principle an infinite number of acceleration pairs $a_{lon}$, $a_{lat}$ is possible. In order to simplify the calculations, the present invention proposes to use a limited number of acceleration values. This is achieved by using a grid 3 of discrete acceleration values. In the example shown, the acceleration values have fixed intervals, but this is not essential.

The exemplary grid 3 illustrated in FIGS. 3 & 4 initially consists of 441 pairs of acceleration values (also referred to as acceleration pairs) 30 or 30'. Each pair is represented in FIGS. 3 & 4 by a nought (pairs 30) or a dot (pairs 30'). The 25 pairs 30' represented by a black dot are selected from the pairs 30, as will be explained below.

The cost determination may involve all acceleration pairs 30 and 30' of the grid 3. However, according to a further aspect of the present invention, the cost determination and subsequent selection of the least-cost pair is carried out in a systematic manner, involving fewer acceleration pairs and therefore saving processing time.

Accordingly, the present invention preferably starts the cost determination and pair selection process using only a set of initial pairs 30', as shown in FIG. 3. This set may be predetermined and is typically chosen so as to include various parts of the grid. In the example of FIG. 3, the set of initial pairs 30' forms a pattern which includes both the zero acceleration pair $a_{lon}=0$, $a_{lat}=0$ and "edge" pairs at the maximum accelerations, as well as a several other pairs. The pattern of initial pairs 30' shown in FIG. 3 is symmetrical and evenly spaced, but this is not essential.

In a first step, illustrated in FIG. 3, the processing unit (11 in FIG. 1) of the system determines the cost of each of the initial pairs 30', in the present example 25 initial pairs 30'. To this end, the processing unit collects sensor data and calculates the cost associated with each pair of acceleration values. The sensor data will typically make it possible to determine the relative or absolute position (that is, the distance and angle) of other objects. By using the Doppler effect, or by repeatedly determining the position of an object, it is possible to make speed and direction estimates.

For each pair of acceleration values of the vehicle, its speed and direction can be determined. Using the speed and direction estimates of both the vehicle and other objects, any possible collisions or other undesired conditions associated with that pair of acceleration values can be detected. Other undesired conditions may comprise coming too close to another object, having too high a speed given the condition and/or curvature of the road, and other conditions.

When collision detection has been carried out for a certain pair of values, the collision cost $C_{Col}$ can be assigned as follows:

Collision: $C_{Col}=1$.
No collision: $C_{Col}=0$.

Similarly, other costs can be determined, such as the driver discomfort cost $C_{Dis}$ caused by braking and swerving:

$$C_{Dis} = \sqrt{\frac{a_{lon}^2}{A} + \frac{a_{lat}^2}{B}}$$

where A and B are suitably chosen scaling factors. If no other costs are taken into account, the total cost $C_{TOT}$ may then be determined:

$$C_{TOT}=C_{Col}+C_{Dis}$$

In this way, a total cost may be assigned to each initial pair. The cost of all initial pairs is compared and the least cost pair(s) is/are provisionally selected.

Of course the formulae provided above are merely exemplary and may be amended or substituted as desired. The formulae may take into account crash energies, vehicle characteristics such as crash resistance of sections of the vehicle, and/or other factors, such as road and/or tyre quality, moisture, etc.

In the present example, the two pairs 31 illustrated in FIG. 3 both have a minimum cost and are both provisionally selected as "optimum" pairs. It is noted that the pairs 31 selected in the first step are necessarily initial pairs (30').

In a second step, illustrated in FIG. 4, the costs are determined of several pairs 30' immediately surrounding the provisionally selected pair or pairs (31 in FIG. 3). In the example shown, the two sets of pairs 30' each surround a least cost pair (31) provisionally selected in the first step. Then the process discussed in connection with the first step is repeated for these pairs 30' only, resulting in a provisionally selected pair 32 having the least cost in this step. It is noted that the pairs 32 selected in the second step are not necessarily initial pairs (30').

In a third step (not illustrated), the process of the second step is essentially repeated. If the least cost pairs change in each step and the least costs decrease, the third step is repeated. If no lower cost pair is found, the procedure may be terminated, resulting in a finally selected least cost. The procedure may also be terminated if the cost decrease resulting from a step is less than a predetermined threshold value.

As it is typically not known beforehand how many steps are required to arrive at a final (that is, unchanging) result, it is preferred that the procedure terminates after a certain amount of time has elapsed. That is, the steps of the procedure are preferably repeated for a predetermined time duration.

Figure 5:
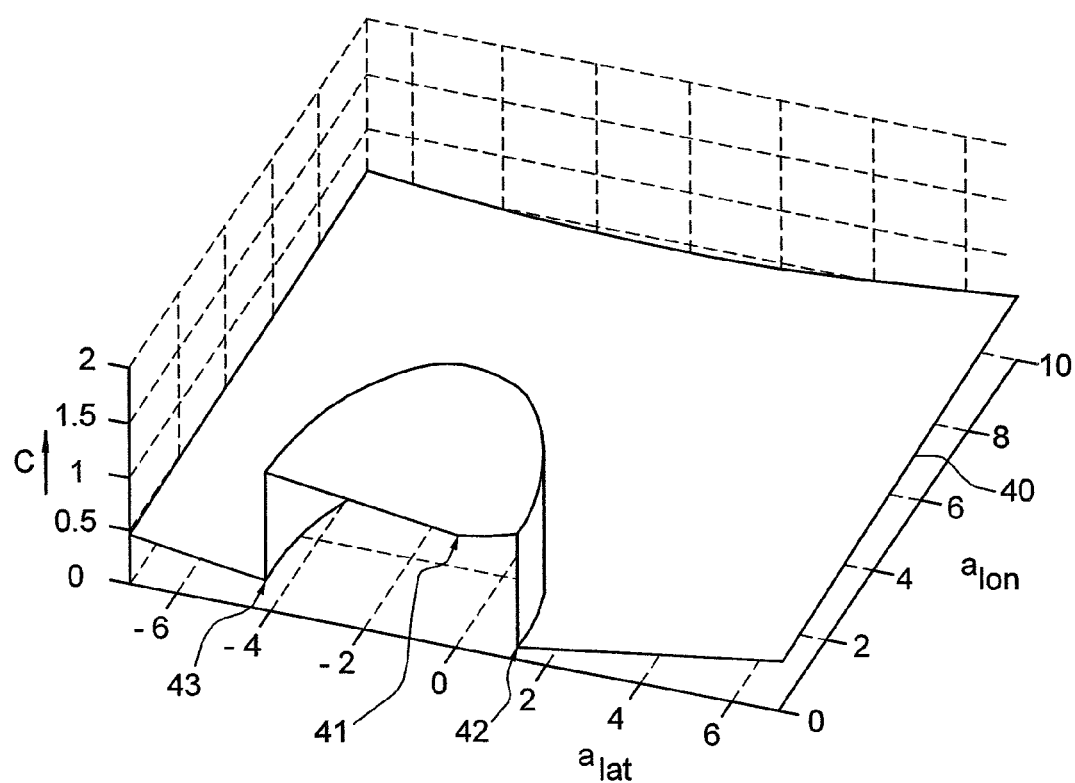
FIG. 5 schematically shows a first example of the perceived cost as a function of longitudinal and lateral accelerations of a vehicle.
Figure 6:
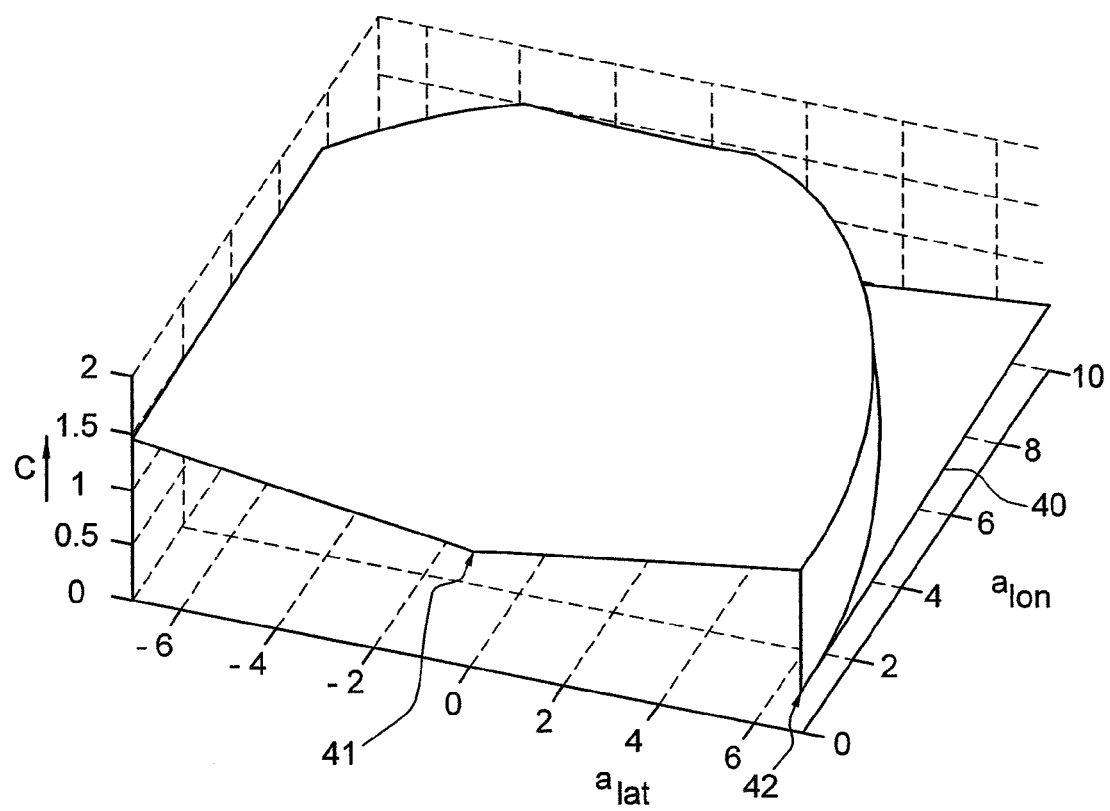
FIG. 6 schematically shows a second example of the perceived cost as a function of longitudinal and lateral accelerations of a vehicle.

The result of a cost determination process is illustrated in FIGS. 5 & 6. In the three-dimensional graph of FIG. 5, the (total) cost C is shown as a function of the longitudinal acceleration $a_{lon}$ and the lateral acceleration $a_{lat}$. FIG. 5 illustrates a situation in which an object is coming from the right, similar to the situation depicted in FIG. 2. The dimensions of the cost plane 40 are defined by the physical limits of the vehicle: in the present example, the maximum longitudinal acceleration $a_{lon}$ is equal to 10, while the maximum lateral acceleration $a_{lat}$ is equal to 7.

It can be seen from FIG. 5 that the cost C is a combination of two factors: the discomfort cost $C_{Dis}$ which increases as the accelerations increase, and the collision cost $C_{Col}$ which is equal to 1 for accelerations which result in a collision (the central raised area of the cost plane 40) and 0 for all other accelerations. At the local minimum 41 a collision is not avoided ($C_{Col}$=1) but the discomfort cost due to swerving is nil ($C_{Dis}$=0) as the initial accelerations of the vehicle are zero. It will be clear that the present invention seeks to avoid such local minima. It will further be understood that the scaling of the costs is largely arbitrary and merely serves to determine comparative costs.

In the example of FIG. 5, a longitudinal acceleration $a_{lon}$ greater than approximately 5 (m/s$^2$) avoids a collision, as does a lateral acceleration $a_{lat}$ greater than approximately 1.5 (steering to the right) or smaller (that is, more negative) than −4. The cost plane 40 rises as the accelerations increase, due to the rising discomfort cost $C_{Dis}$. Accordingly, a local minimum 43 occurs at $a_{lat}$=−4 and $a_{lon}$=0, where a collision is (just) avoided at a minimum discomfort to the driver. A global minimum 42 occurs at $a_{lat}$=+1.5 and $a_{lon}$=0. Accordingly, the present invention selects this global minimum 42 and produces driving assistance information in accordance with these acceleration values. This selection preferably takes place using the selection process illustrated in FIGS. 3 & 4.

It is noted that not all acceleration pairs of the cost plane 40 shown in FIG. 5 may be feasible due to road and/or tyre conditions. Such acceleration pairs may be excluded, preferably by assigning a high cost to such pairs. This is not shown in the example of FIG. 5 for the sake of clarity of the illustration.

In one embodiment, the system of the present invention provides visual and/or acoustic information to the driver, advising her to steer right in the present example. In another embodiment, the system actively steers the vehicle to the right. It can be seen that if the driver brakes, less steering is required to avoid a collision. Braking sensors may therefore be used to adjust any automatic steering actions in response to the driver's actions, and to provide feedback to the system during automatic braking.

In general, the method and system of the present invention will adjust the movement of the vehicle in such a way that the acceleration of the vehicle is optimal and corresponds to the least cost acceleration. In addition, the present invention preferably provides an adjustment which is as small as possible.

In the example of FIG. 6 an object comes from the right and a collision is almost unavoidable. Again, a local minimum 41 is found at $a_{lon}$=0, $a_{lat}$=0, while the global minimum 42 is be found at $a_{lon}$=0, $a_{lat}$=7. It can be seen that steering to the right (just) avoids a collision, while steering to the left inevitably results in a collision at a relatively high cost of approximately 1.5.

The present invention provides driver information indicating the optimal (least cost) path of the vehicle. This optimal path is defined by accelerations which are determined numerically. Sensor data are used to determine which accelerations are required. The present invention can advantageously be used in an Advanced Driving Assistance (ADA) system.

Although the present invention has been described with reference to road vehicles, the invention is not so limited and may equally well be applied to other means of transportation, such as ships and airplanes. Those skilled in the art will be able to make suitable adaptations without requiring any inventive activity. In the case of ships, for example, braking can be effected by switching into reverse gear, while airplanes may use flaps for braking. In the case of airplanes or helicopters, vertical accelerations may additionally be taken into account.

Accordingly, the present invention can be said to provide a system and method for providing driving assistance information for a means of transportation, such as a vehicle, ship, airplane, rocket, etc. Vehicles are not limited to cars or trucks but may also include buses, forklift trucks and robot vehicles. Even rail vehicles such as trains, including metro trains, monorail trains and magnetic levitation trains, may benefit from the inventive system and method.

The present invention is based upon the insight that a generic vehicle driving assistance method and system is advantageously based upon acceleration values, as such values define the trajectory of the vehicle. The present invention benefits from the further insight that cost criteria are very suitable for selecting an optimal set of acceleration values.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A system for providing driving assistance information for a vehicle, using a cost function that defines costs of pairs of acceleration values, each pair of acceleration values representing a longitudinal and a lateral acceleration of the vehicle, the cost function involving the occurrence of a collision and a measure of comfort of the driver as a function of the pairs of acceleration values, the system comprising:
    sensor units for collecting sensor data concerning the vehicle and its surroundings, and
    a processing unit for:
        determining a cost of pairs of acceleration values according to the cost function on a basis of the sensor data collected by the sensor units,
        selecting a pair of least cost acceleration values, and
        providing driving assistance information including the pair of least cost acceleration values.

2. The system according to claim 1, the processing unit being arranged for determining the pair of least cost acceleration values by determining a cost of an initial set of pairs of acceleration values, determining a cost of surrounding pairs, and then selecting a pair, from the initial set and surrounding pairs, having the least cost.

3. The system according to claim 2, wherein the initial set of pairs is a predetermined set of pairs.

4. The system according to claim 1, the acceleration values having discrete values.

5. The system according to claim 1, the processing unit being arranged for determining the cost of a pair by weighing sensor data.

6. The system according to claim 1, the processing unit being arranged for determining the cost of a pair by involving a set of factors including: a position and a relative speed of another object, and/or properties of the vehicle.

7. The system according to claim 1, the processing unit being arranged to provide visible, audible and/or haptic driving assistance information for a driver of the vehicle.

8. The system according to claim 1, the processing unit being coupled to a steering unit to provide steering assistance.

9. The system according to claim 1, the processing unit being coupled to a braking unit in order to provide braking assistance.

10. A processing unit for use in a system according to claim 1.

11. A vehicle comprising a system according to claim 1.

12. A method of providing driving assistance information for a vehicle comprising sensor units for collecting sensor data concerning the vehicle and its surroundings, and a processing unit for processing the sensor data, the method making use of a cost function that defines costs of pairs of acceleration values, each pair of acceleration values representing a longitudinal and a lateral acceleration of the vehicle, the cost function defining the cost of each pair involving the occurrence of a collision and a measure of comfort of the driver, the method comprising the steps of:
determining the cost of pairs of acceleration values according to the cost function on a basis of the sensor data,
selecting a pair of least cost acceleration values, and
providing driving assistance information including the pair of least cost acceleration values.

13. The method according to claim 12, the acceleration values having discrete values.

14. The method of claim 12, said determining the cost of pairs of acceleration values and selecting the pair of least cost acceleration values comprises:
determining the cost of an initial set of pairs of acceleration values,
determining the cost of surrounding pairs, and then
selecting the pair from the initial set and the surrounding pairs having the least cost.

15. A non-transitory computer program product comprising computer-executable instructions that are configured to cause a programmable computer to carry out, for a vehicle comprising sensor units for collecting sensor data concerning the vehicle and its surroundings, and the programmable computer processing the sensor data and making use of a cost function that defines costs of pairs of acceleration values, each pair of acceleration values representing a longitudinal and a lateral acceleration of the vehicle, the cost function defining the cost of each pair involving the occurrence of a collision and a measure of comfort of the driver, the steps of:
determining the cost of pairs of acceleration values according to the cost function on the basis of the sensor data,
selecting a pair of least cost acceleration values, and
providing driving assistance information including the pair of least cost acceleration values.

16. The non-transitory computer program product of claim 15, the acceleration values having discrete values.

17. The non-transitory computer program product of claim 15, said determining the cost of pairs of acceleration values and selecting the pair of least cost acceleration values comprises:
determining the cost of an initial set of pairs of acceleration values,
determining the cost of surrounding pairs, and then
selecting the pair from the initial set and the surrounding pairs having the least cost.

18. The non-transitory computer program product of claim 17, wherein the initial set of pairs is a predetermined set of pairs.

19. The method according to claim 14, wherein the initial set of pairs is a predetermined set of pairs.

* * * * *

UNITED STATES PATENT AND TRADEMARK OFFICE
CERTIFICATE OF CORRECTION

PATENT NO.      : 8,428,860 B2                                          Page 1 of 1
APPLICATION NO. : 12/526478
DATED           : April 23, 2013
INVENTOR(S)     : Schutyser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this
Eighth Day of September, 2015

Michelle K. Lee
*Director of the United States Patent and Trademark Office*